United States Patent
Prodan

(10) Patent No.: US 9,553,683 B2
(45) Date of Patent: Jan. 24, 2017

(54) UPSTREAM (US) TRANSIENT IMPAIRMENT LOCALIZATION AND DETECTION WITHIN COMMUNICATION SYSTEMS

(71) Applicant: BROADCOM CORPORATION, Irvine, CA (US)

(72) Inventor: Richard Stephen Prodan, Niwot, CO (US)

(73) Assignee: BROADCOM CORPORATION, Irvine (*) Notice: Subject to any disclaimer, the term of this patent is extended or adjusted under 35 U.S.C. 154(b) by 0 days.

(21) Appl. No.: 14/826,890

(22) Filed: Aug. 14, 2015

(65) Prior Publication Data

US 2016/0050127 A1 Feb. 18, 2016

Related U.S. Application Data

(60) Provisional application No. 62/037,304, filed on Aug. 14, 2014.

(51) Int. Cl.
*H04B 3/46* (2015.01)
*H04B 17/318* (2015.01)
(Continued)

(52) U.S. Cl.
CPC .............. *H04B 17/318* (2015.01); *H04B 1/40* (2013.01); *H04B 3/46* (2013.01); *H04B 17/10* (2015.01);
(Continued)

(58) Field of Classification Search
CPC ..... H04B 17/10; H04B 17/101; H04B 17/104; H04B 17/15; H04B 17/16; H04B 17/17; H04B 17/18; H04B 17/309; H04B 17/345; H04B 3/46; H04B 14/08; H04B 1/38; H04B 1/40; H04B 17/318; H04L 27/2601; H04N 21/60; H04N 21/6118; H04W 24/06; H04W 24/08
(Continued)

(56) References Cited

U.S. PATENT DOCUMENTS 7,020,224 B2 * 3/2006 Krivokapic ........ H04B 1/71637
375/343
7,492,703 B2 * 2/2009 Lusky ................... H04L 1/0001
370/210
(Continued)

*Primary Examiner* — Betsy Deppe
(74) *Attorney, Agent, or Firm* — Garlick & Markison; Shayne X. Short

(57) ABSTRACT

A communication device (alternatively, device) includes a processor configured to support communications with other communication device(s) and to generate and process signals for such communications. In some examples, the device includes a communication interface and a processor, among other possible circuitries, components, elements, etc. to support communications with other communication device(s) and to generate and process signals for such communications. A device directs an analog to digital converter (ADC) to perform a sample capture of a communication channel and processes that sample capture to generate a detected power. The device performs an integrate-and-dump (I&D) operation on the detected power over at least one time period to generate an integrated power and then generates an integrated power histogram of the communication channel that includes the integrated power. This integrated power histogram characterizes noise generated by the device, noise entering the device, noise associated with the communication channel, etc.

25 Claims, 8 Drawing Sheets

(51) Int. Cl.
      *H04B 17/10*          (2015.01)
      *H04L 27/26*          (2006.01)
      *H04N 21/61*          (2011.01)
      *H04W 24/08*         (2009.01)
      *H04B 1/40*           (2015.01)

(52) U.S. Cl.
      CPC ....... *H04L 27/2601* (2013.01); *H04N 21/6118* (2013.01); *H04W 24/08* (2013.01)

(58) Field of Classification Search
      USPC   375/219, 220, 222, 224, 227, 260; 725/111, 725/117, 121, 124, 125
      See application file for complete search history.

(56) References Cited

U.S. PATENT DOCUMENTS

| | | | | |
|---|---|---|---|---|
| 2002/0141347 A1* | 10/2002 | Harp | ................ | H04L 25/03343 370/248 |
| 2002/0190846 A1* | 12/2002 | Al-Araji | ............. | H04L 12/2602 340/286.01 |
| 2004/0091030 A1* | 5/2004 | Rakib | .................... | G06F 1/183 375/222 |

\* cited by examiner

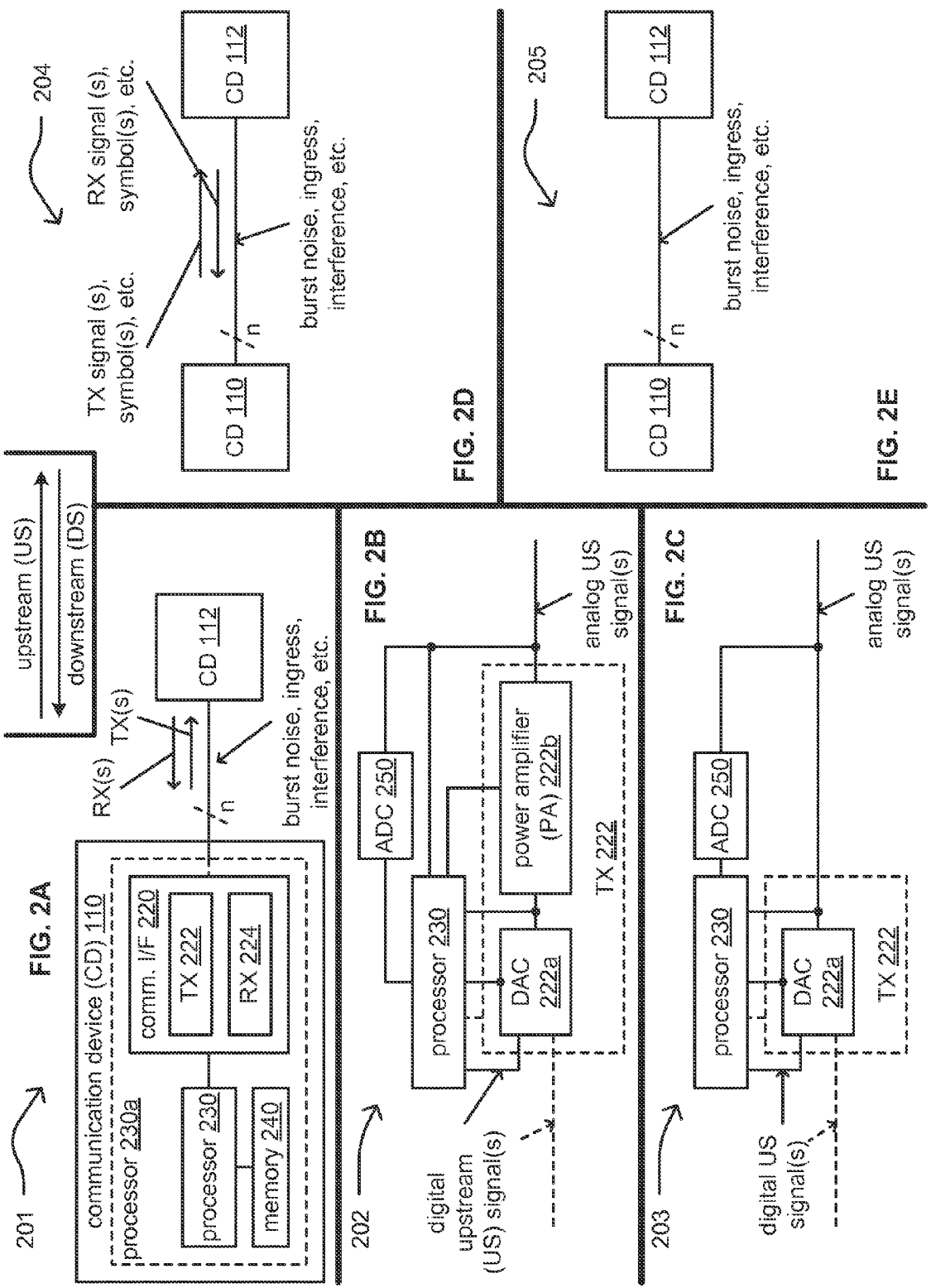

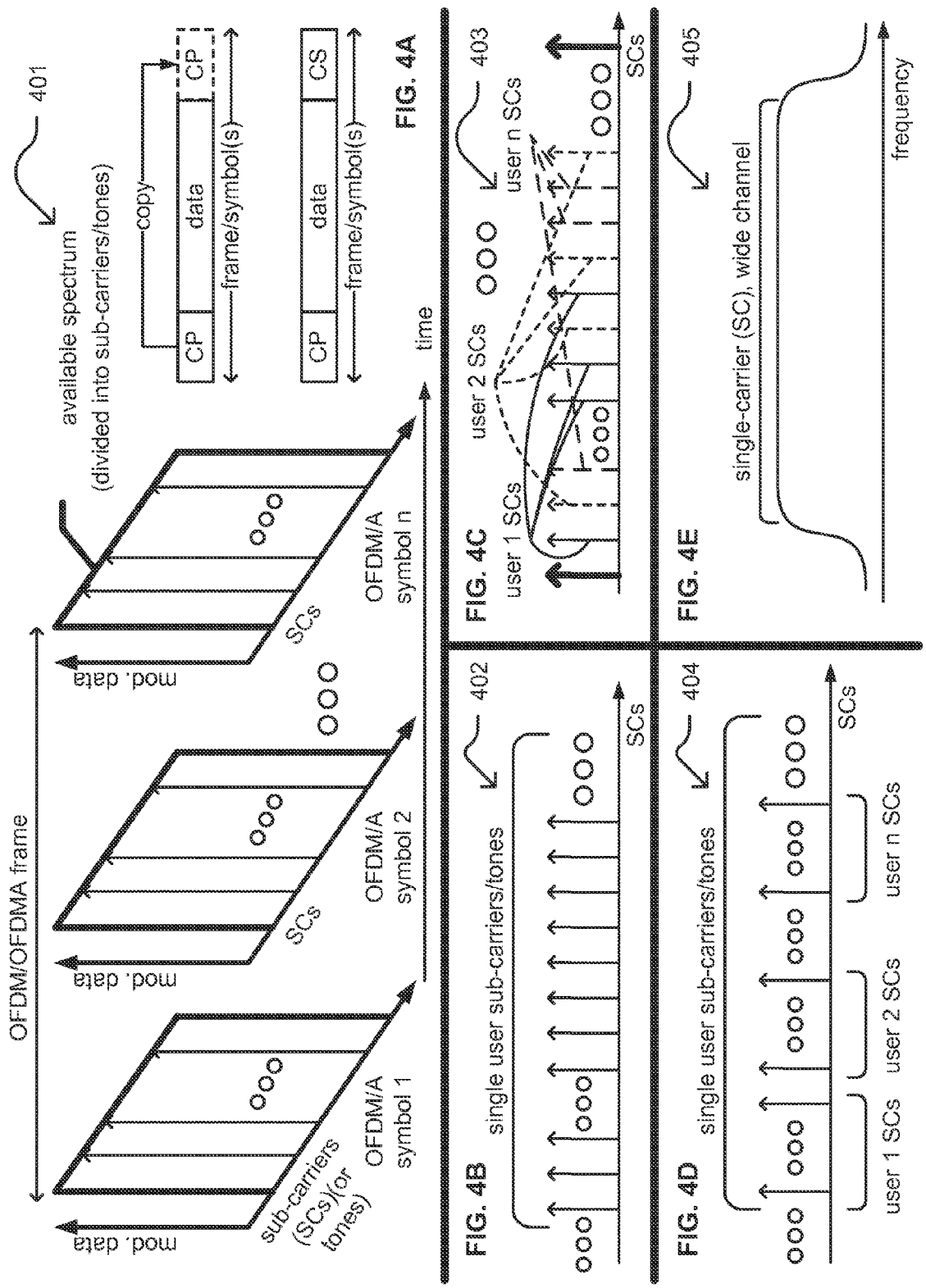

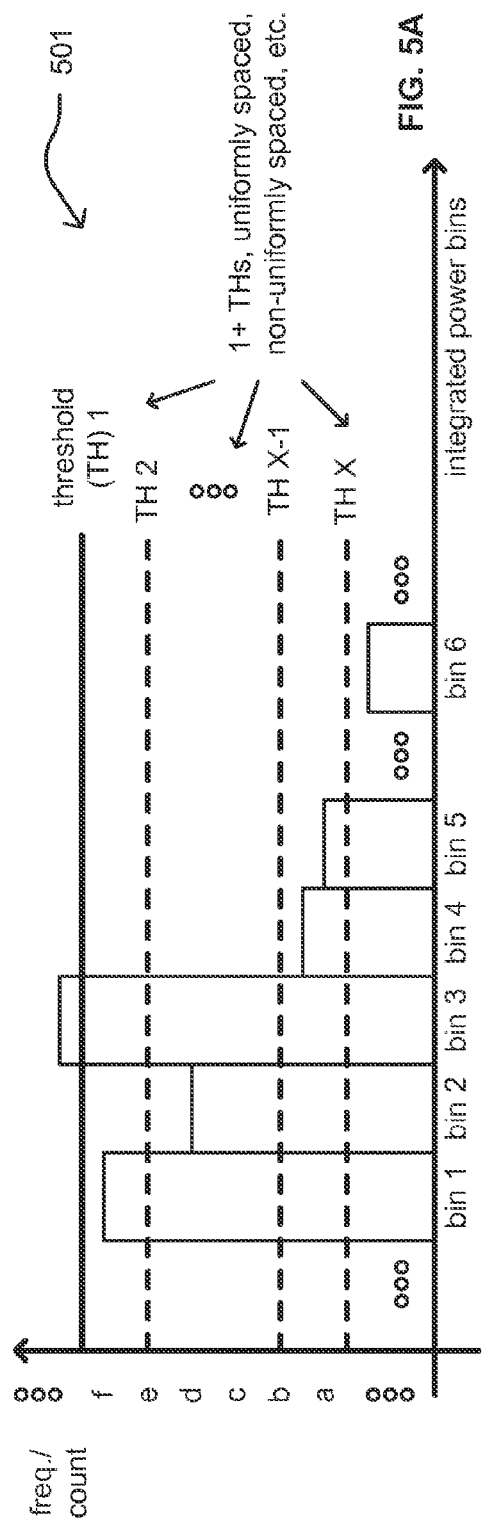
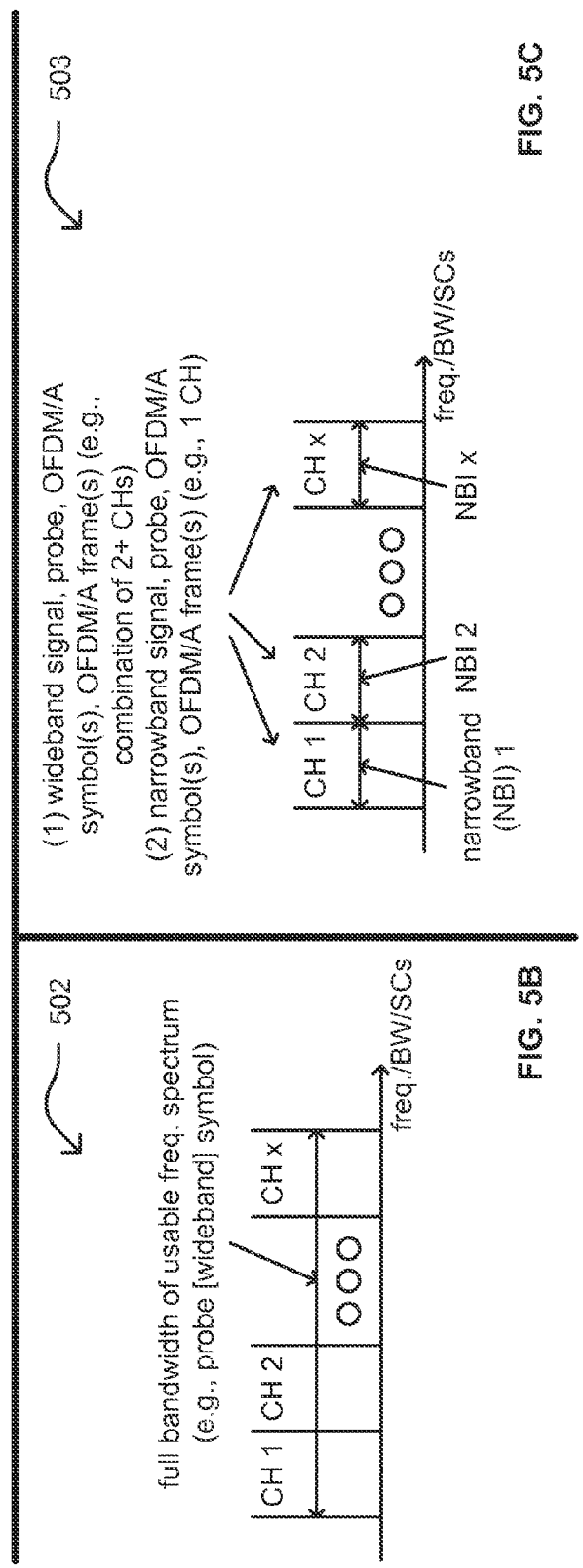
FIG. 5A
FIG. 5B
FIG. 5C

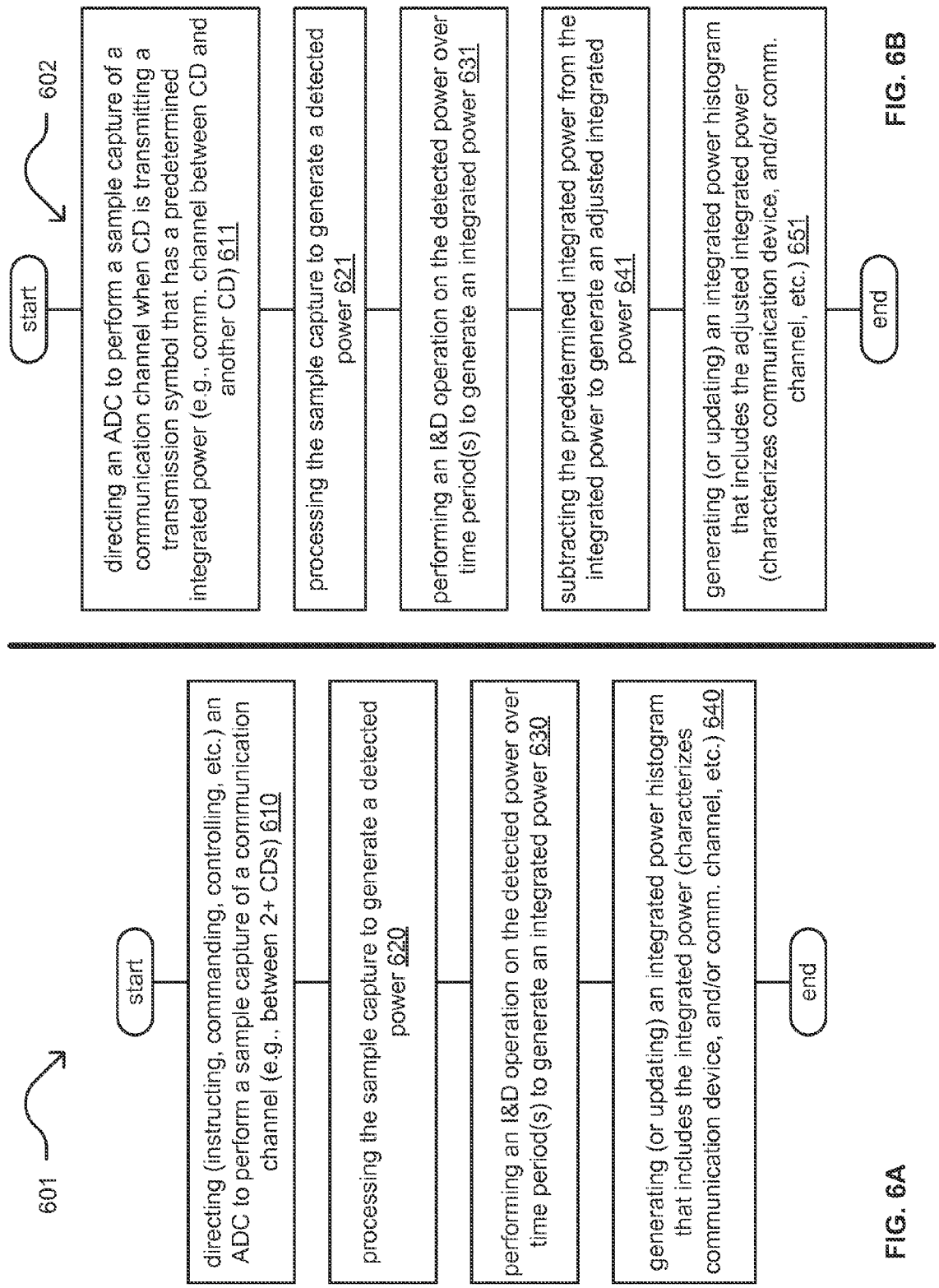

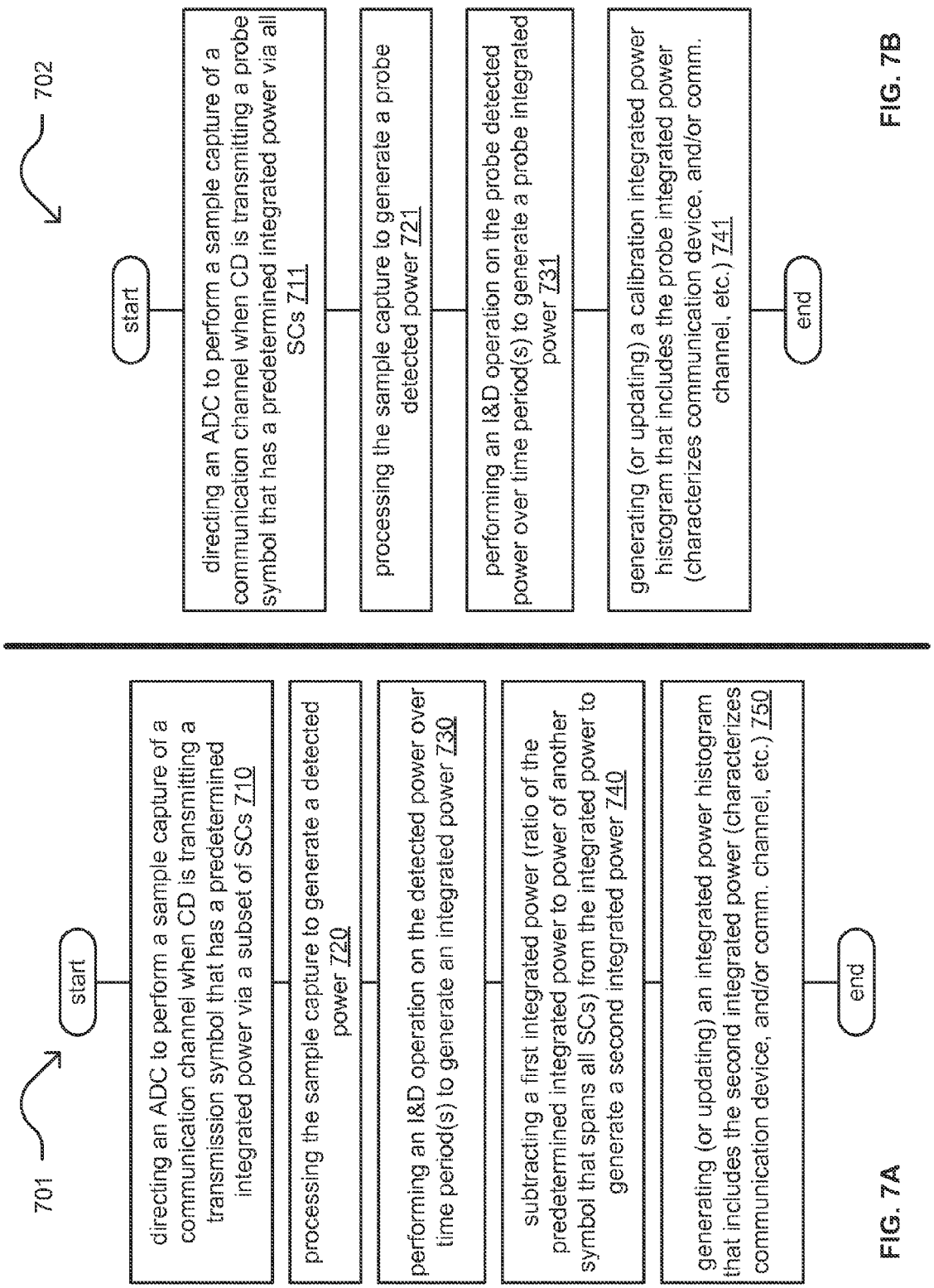

UPSTREAM (US) TRANSIENT IMPAIRMENT LOCALIZATION AND DETECTION WITHIN COMMUNICATION SYSTEMS

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 62/037,304, entitled "Upstream (US) transient impairment localization and detection within communication systems," filed Aug. 14, 2014, which is hereby incorporated herein by reference in its entirety and made part of the present U.S. Utility Patent Application for all purposes.

BACKGROUND

Technical Field

The present disclosure relates generally to communication systems; and, more particularly, to impairment localization and detection within such communication systems.

Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of adverse effects include interference and noise that may be caused by various sources including other communications, natural and man-made noise, low-quality links, degraded or corrupted interfaces and connectors, etc.

Some communication systems use forward error correction (FEC) coding and/or error checking and correction (ECC) coding to increase the reliability and the amount of information that may be transmitted between devices. When a signal incurs one or more errors during transmission, a receiver device can employ the FEC or ECC coding to try to detect and/or correct those one or more errors.

A continual and primary directive in this area of development has been to try continually to lower the signal to noise ratio (SNR) required to achieve a given bit error ratio (BER) or symbol error ratio (SER) within a communication system. The Shannon limit is the theoretical bound for channel capacity for a given modulation and code rate. The ideal goal has been to try to reach Shannon's channel capacity limit in a communication channel. Shannon's limit may be viewed as being the maximum data rate per unit of bandwidth (i.e., spectral efficiency) to be used in a communication channel, having a particular SNR, where transmission through the communication channel with arbitrarily low BER or SER is achievable.

Various problems such as equipment failure, degrading interfaces or connectors, etc. may themselves cause problems and/or allow external noise to enter the link and reduce the overall effectiveness of communications within such communication systems.

Diagnosis of such problems is typically performed by service personnel who conduct a service call to one or more locations where customers complain of poor service. Also, such service personnel can only analyze one given location at a time. A great deal of time is required to perform analysis of multiple locations within a multi-user communication system, and this procedure may be very labor and cost intensive.

BRIEF DESCRIPTION OF THE SEVERAL VIEWS OF THE DRAWINGS

FIG. 2A is a diagram illustrating an example of a communication device operative within one or more communication systems.

FIG. 2B is a diagram illustrating an example of at least a portion of a communication device operative within one or more communication systems.

FIG. 2C is a diagram illustrating another example of at least a portion of a communication device operative within one or more communication systems.

FIG. 2D is a diagram illustrating another example of a communication device operative within one or more communication systems.

FIG. 2E is a diagram illustrating another example of a communication device operative within one or more communication systems.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 4E is a diagram illustrating an example of single-carrier (SC) signaling.

FIG. 5A is a diagram illustrating an example of an integrated power histogram.

FIG. 5B is a diagram illustrating an example of a communication channel partitioned into multiple sub-bands or sub-channels.

FIG. 5C is a diagram illustrating another example of a communication channel partitioned into multiple sub-bands or sub-channels.

FIG. 6A is a diagram illustrating an embodiment of a method for execution by one or more communication devices.

FIG. 6B is a diagram illustrating another embodiment of a method for execution by one or more communication devices.

FIG. 7A is a diagram illustrating another embodiment of a method for execution by one or more communication devices.

FIG. 7B is a diagram illustrating another embodiment of a method for execution by one or more communication devices.

DETAILED DESCRIPTION

Figure 1A:
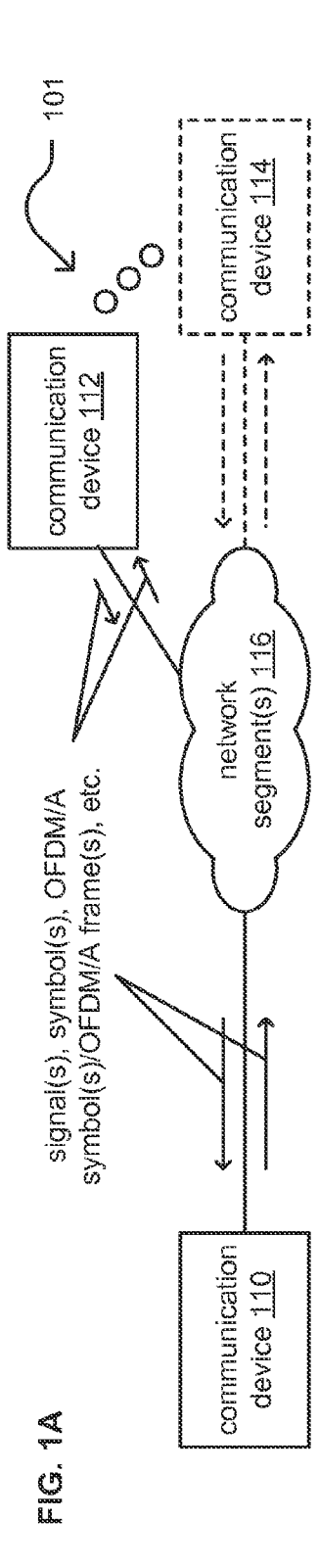
FIG. 1A is a diagram illustrating an embodiment of one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or communication device 110 when referring to communication device 110, or devices 110 and 112, or communication devices 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114.

In an example, device 110 includes a communication interface and a processor (and possibly other possible circuitries, components, elements, etc.) to support communications with other device(s) and to generate and process signals for such communications. The communication interface and/or the processor operate to perform various operations and functions to effectuate such communications.

In an example of operation, one of the devices, such as device 110, includes a communication interface and/or a processor that operate to support communications with another device, such as device 112, among others within the system. For example, the processor is operative to generate and interpret different signals, frames, packets, symbols, etc. for transmission to other devices and that have been received from other devices.

In an example, device 110 includes an analog to digital converter (ADC) configured to generate sample captures of various signals. The device also includes a processor that directs (e.g., instructs, controls, etc.) the ADC to perform a sample capture of a communication channel between the device 110 and the device 112 (and/or device 114). The processor then processes the sample capture to generate a detected power and performs an integrate-and-dump (I&D) operation on the detected power over at least one time period to generate an integrated power. The processor then generates an integrated power histogram of the communication channel that includes the integrated power. This integrated power histogram characterizes noise generated by the communication device and/or other noise entering the communication device.

In some examples, the device 110 operates to generate more than one integrated powers to build up the integrated power histogram. Note also that such integrated powers may be generated when the device 110 is either transmitting a signal or not transmitting any signal. Considering an example when the device 110 is transmitting a signal, the device generates a transmission symbol having a predetermined integrated power. When the device 110 generates such a transmission symbol, the device 110 knows characteristics of the transmission symbol (e.g., type, size, length, duration, power, modulation, coding type, modulation coding set (MCS), etc. and/or any other characteristic thereof). The device 110 then transmits the transmission symbol into the communication channel and directs the ADC to perform a sample capture of the communication channel during transmission of that transmission symbol into the communication channel. The device 110 then processes such a sample capture to generate another detected power and performs another integrate-and-dump (I&D) operation thereon to generate another integrated power. The device 110 then subtracts the predetermined integrated power from this other integrated power to generate an adjusted integrated power. This operation effectively removes the effect or influence of the transmission symbol before updating the integrated power histogram with any effect from the transmission symbol during its transmission from the device 110. The device 110 then updates the integrated power histogram of the communication channel using the adjusted integrated power (e.g., after the removal of the effect or influence of the transmission symbol).

Note also that some transmission symbol, such as in an orthogonal frequency division multiplexing (OFDM) and/or orthogonal frequency division multiple access (OFDMA) communication system, may be transmitted via less than all sub-carriers available for use therein and/or less than a full or maximum power available for use therein. When this occurs, the device 110 can subtract an appropriately scaled amount of integrated power from another integrated power generated by another integrate-and-dump (I&D) operation (e.g., appropriately scaled based on a sample capture made during transmission of such a transmission symbol made with a reduced number of sub-carriers and/or power).

In addition, note that the device 110 may be configured to perform calibration of the communication system, communication channel, and/or the device 110 itself using a probe symbol (e.g., a wideband and/or fullband probe). A fullband probe spans a full bandwidth of a usable frequency spectrum within the communication channel between the device 110 and the device 112 (and/or device 114). The device 110 then performs such sample capture, probe detected power generation, integrate-and-dump (I&D) operation to generate a probe integrated power, and generate a calibration integrated power histogram of the communication channel that includes the probe integrated power. Such a calibration integrated power histogram characterizes the communication system, communication channel, and/or the device 110 with respect to transmission of any transmission symbol, and the associated integrated power (e.g., I&D value thereof) will be known. With respect to such a probe symbol, when the device 110 generates such a probe symbol, the device 110 knows characteristics of the probe symbol (e.g., type, size, length, duration, power, modulation, coding type, modulation coding set (MCS), etc. and/or any other characteristic thereof). From some perspectives, calibration operations associated with such a probe symbol can provide baseline characterization of the communication system, communication channel, and/or the device 110. Such a calibration integrated power histogram characterizes noise generated by the device 110 and/or other noise entering the communication device during transmission of the probe symbol that spans the bandwidth of the probe symbol (e.g., fullband, wideband, etc.) of the respective frequency spectrum within the communication channel.

Also, in another example of operation, the device 110 operates to analyze such an integrated power histogram to identify whether the updated integrated power histogram includes any value that exceeds at least one threshold. Such an integrated power histogram includes a number of integrated power bins, and any desired number of thresholds may be used with respect to the various integrated power bins (e.g., different thresholds respective for each cumulative sum of contiguous integrated power bins that include the relatively highest power bin; a first threshold for a first sum of two or more such contiguous integrated power bins and a second threshold for a second sum of three or more such contiguous integrated power bins and so on; etc.). The device 110 operates by comparing the summed counts within the integrated power bins of the integrated power histogram to identify erroneous operation of the communication system, communication channel, and/or the device 110 when an integrated power histogram cumulative sum includes the at least one value that exceeds at least one threshold. Again, such analysis may be made overall with respect to the entire integrated power histogram, on a subset of contiguous bins basis across the integrated power histogram, etc.

In another example of operation, the device 110 operates to generate the integrated power histogram (and/or information) that may be used to generate such an integrated power histogram, and the device 110 then transmits the integrated power histogram (and/or information corresponding thereto) to and for use by another device (e.g., device 112, 114, etc.). Such another device may be a proactive network maintenance (PNM) communication device, a cable modem termination system (CMTS), a cable headend transmitter, and/or any other device within the system.

Figure 1B:
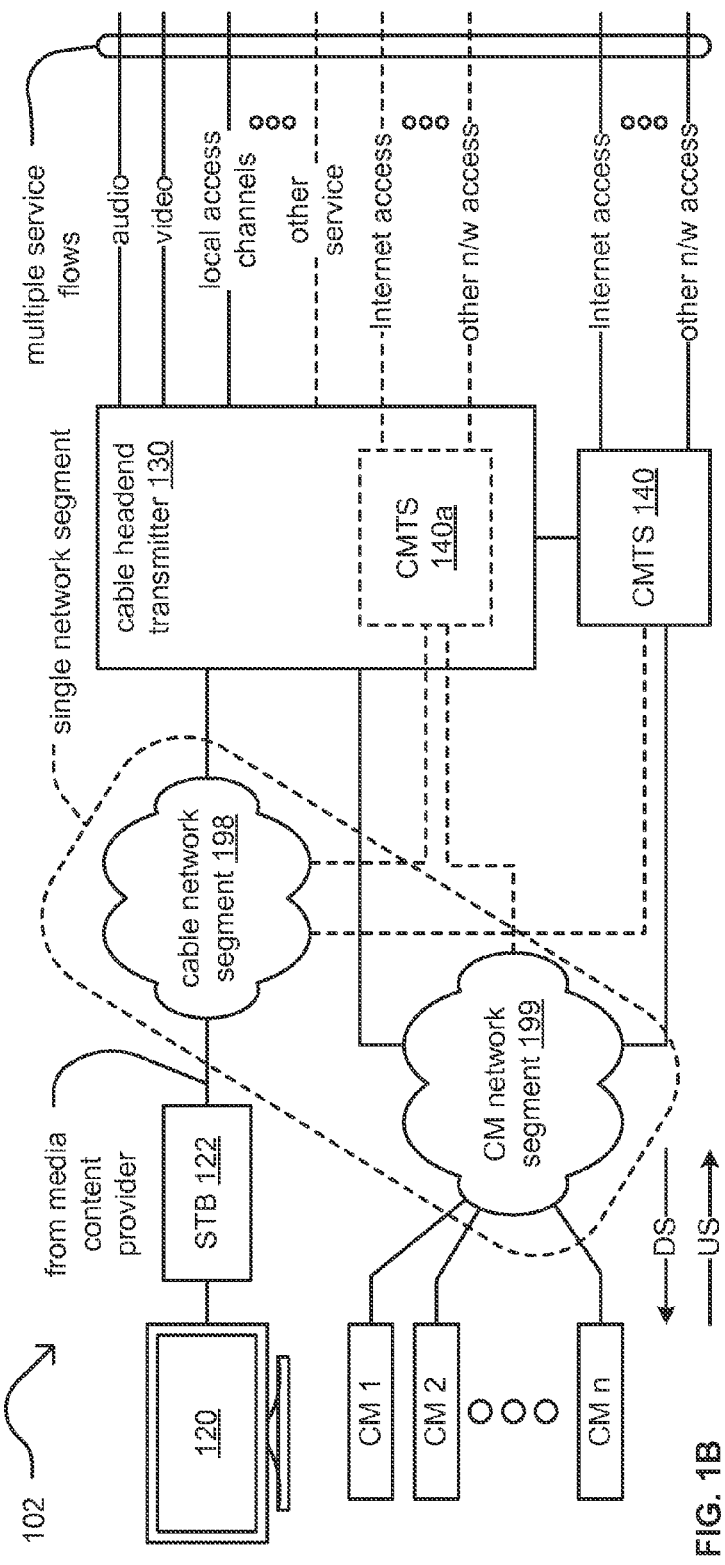
FIG. 1B is a diagram illustrating another embodiment of one or more communication systems.

FIG. 1B is a diagram illustrating another embodiment 102 of one or more communication systems. A cable headend transmitter 130 provides service to a set-top box (STB) 122 via cable network segment 198. The STB 122 provides output to a display capable device 120. The cable headend transmitter 130 can support any of a number of service flows such as audio, video, local access channels, as well as any other service of cable systems. For example, the cable headend transmitter 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140). The CMTS 140 can provide network service (e.g., Internet, other network access, etc.) to any number of cable modems (shown as CM 1, CM 2, and up to CM n) via a cable modem (CM) network segment 199. The cable network segment 198 and the CM network segment 199 may be part of a common network or common networks. The cable modem network segment 199 couples the cable modems 1-n to the CMTS (shown as 140 or 140a). Such a cable system (e.g., cable network segment 198 and/or CM network segment 199) may generally be referred to as a cable plant and may be implemented, at least in part, as a hybrid fiber-coaxial (HFC) network (e.g., including various wired and/or optical fiber communication segments, light sources, light or photo detection components, etc.).

A CMTS 140 (or 140a) is a component that exchanges digital signals with cable modems 1-n on the cable modem network segment 199. Each of the cable modems is coupled to the cable modem network segment 199, and a number of elements may be included within the cable modem network segment 199. For example, routers, splitters, couplers, relays, and amplifiers may be contained within the cable modem network segment 199. Generally speaking, downstream information may be viewed as that which flows from the CMTS 140 to the connected cable modems (e.g., CM 1, CM2, etc.), and upstream information as that which flows from the cable modems to the CMTS 140.

In an example of operation, CM 1 includes an analog to digital converter (ADC) and a processor. The processor is configured to direct the ADC to perform a sample capture of a communication channel between the CM 1 and the CMTS 140 (or CMTS 140a). The CM 1 processes the sample capture to generate a detected power and performs an integrate-and-dump (I&D) operation on the detected power over at least one time period to generate an integrated power. The CM 1 then generates an integrated power histogram of the communication channel that includes the integrated power. This integrated power histogram characterizes noise generated by the CM 1 and/or noise entering the CM 1. The CM 1 can generate various integrated powers to add to the integrated power histogram when the CM 1 is transmitting and when the CM 1 not transmitting. When the CM 1 is transmitting, the CM 1 operates to remove the effect of a sample capture made when the CM 1 is transmitting before updating the integrated power histogram or before including any integrated power that generated when the CM 1 is transmitting. When the CM 1 generates the transmission symbol, the CM 1 knows characteristics of the transmission symbol (e.g., type, size, length, duration, power, modulation, coding type, modulation coding set (MCS), etc. and/or any other characteristic thereof), and the CM 1 can then remove effects of the transmission symbol from the integrated power generated during transmission of that transmission symbol to generate an integrated power that includes only noise detected within the communication system, communication channel, and/or the CM 1.

Note that similar operations may be performed within other CMs within the system (e.g., CM 2 through CM n), and such information may be used to identify and localize any impairment within the communication system on a per CM basis (e.g., discriminate any individual CM that is a source of noise, burst noise, interference, impairment, etc. that may lead to reduced performance). Also, in other examples, note that such functionality, capability, operations, etc. as described with respect to the CM 1 may be performed within the CMTS 140 (or CMTS 140a) and/or generally any other device, communication device etc. within the communication system.

FIG. 2A is a diagram illustrating an example 201 of a communication device operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., communication device 112 and/or other communication devices). Operation of the communication interface 220 may be directed by the processor 230 such that processor 230 transmits and receives signals (TX(s) and RX(s)) via the communication interface 220.

Generally speaking, the communication interface 220 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 110 operates), equalization, pre-equalization, metric generation, symbol mapping and/or de-mapping, automatic gain control (AGC) operations, and/or any other operations that may be performed by an AFE and/or PHY component within a communication device.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

Also, in some examples, note that one or more of the processor 230, the communication interface 220 (including the TX 222 and/or RX 224 thereof), and/or the memory 240 may be implemented in one or more "processing modules," "processing circuits," "processors," and/or "processing units". Considering one example, one processor 230a may be implemented to include the processor 230, the communication interface 220 (including the TX 222 and/or RX 224 thereof), and the memory 240. Considering another example, two or more processors may be implemented to include the processor 230, the communication interface 220 (including the TX 222 and/or RX 224 thereof), and the memory 240. In such examples, such a "processor" or "processors" is/are configured to perform various operations, functions, communications, etc. as described herein. In general, the various elements, components, etc. shown within the device 110 may be implemented in any number of "processing modules," "processing circuits," "processors," and/or "processing units" (e.g., 1, 2, . . . , and generally using N such "processing modules," "processing circuits," "pro-cessors," and/or "processing units", where N is a positive integer greater than or equal to 1).

FIG. 2B is a diagram illustrating an example 202 of at least a portion of a communication device operative within one or more communication systems. In an example of operation, device 110 includes an analog to digital converter (ADC) 250, the processor 230, a digital to analog converter (DAC) 222a, and a power amplifier (PA) 222b. In some examples, the DAC 222a and the PA 222b are included within the TX 222 of the communication interface 220.

The processor 230 is configured to direct the ADC 250 to perform a sample capture of a communication channel between the device 110 and another communication device (e.g., device 112) sampled at the output of the PA 222b. The processor 230 processes the sample capture to generate a detected power and perform an integrate-and-dump (I&D) operation on the detected power over at least one time period to generate an integrated power. The processor 230 then generates an integrated power histogram of the communication channel that includes the integrated power, wherein the integrated power histogram characterizes noise generated by the device 110 and/or noise entering the device 110.

Note that the processor 230 may be configured to generate one or more digital upstream (US) signals to be processed by the DAC 222a (to perform discrete-time/digital to continuous-time/analog signal conversion) to generate a an input for the PA 222b that outputs one or more analog US signals for transmission into one or more communication channels. Alternatively, the DAC 222a may be configured to receive one or more digital US signals from another source such as another processor, another device, etc. Also, the processor 230 may be configured to instruct, control, direct, etc. operation of the DAC 222a, the PA 222b, and/or the ADC 250.

In other examples, the communication device 110 directs DAC 222a and PA 222b to enable removal of the transmitted signal in a communication channel interface (e.g., communication interface 220), which is then sampled by ADC 250, to perform a sample capture in the communication channel and processes the sample capture to generate a detected noise sample for time domain and/or spectral analysis.

In another example of implementation and operation, the device 110 includes a communication interface that includes an analog to digital converter (ADC), a digital to analog converter (DAC), and a power amplifier (PA). For example, in one possible example, communication interface 220 includes ADC 250, DAC 222a, and PA 222b. The device 110 includes a processor (e.g., processor 230 or 230a) that is configured to support communications, via the communication interface (e.g., communication interface 220) and via a communication channel another communication device (e.g., device 112). The processor is also configured to process an ADC input signal, an ADC output signal, a DAC input signal, a DAC output signal, a PA input signal, and/or a PA output signal to identify and characterize any upstream (US) transient impairment within the device 110.

In an example of implementation and operation, the processor monitors the DAC output signal, the PA input signal, and/or the PA output signal. The processor attenuates the PA output signal based on the DAC output signal to generate an attenuated PA output signal and subtracts the DAC output signal from the attenuated PA output signal to remove a transmitted signal from a signal including noise that is detected at an input to the communication channel to generate a noise-only signal. The processor then directs the ADC to sample the noise-only signal to generate a sample capture and processes the sample capture to identify and characterize any US transient impairment within the device 110.

In some example of implementation and operation, the processor transmits information related to identification and characterization of the US transient impairment to the device 112 and/or a proactive network maintenance (PNM) communication device.

FIG. 2C is a diagram illustrating another example 203 of at least a portion of a communication device operative within one or more communication systems. In an example of operation, device 110 includes the ADC 250, the processor 230, and the DAC 222a. In some examples, the DAC 222a is included within the TX 222 of the communication interface 220.

The processor 230 is configured to direct the ADC 250 to perform a sample capture of a communication channel between the device 110 and another communication device (e.g., device 112) sampled at the output of the DAC 222a. The processor 230 processes the sample capture to generate a detected power and perform an integrate-and-dump (I&D) operation on the detected power over at least one time period to generate an integrated power. The processor 230 then generates an integrated power histogram of the communication channel that includes the integrated power, wherein the integrated power histogram characterizes noise generated by the device 110 and/or noise entering the device 110.

In various examples, note that the processor 230 may be configured to direct the ADC 250 generate sample captures at different locations within the device 110 (e.g., output from the DAC 222a, output of the PA 222b, and/or other locations within the device 110 and/or other nodes, connections, couplings, etc. associated with the device 110, the communication system in which the device 110 is implemented, and/or any communication channel with which the device 110 interacts)

FIG. 2D is a diagram illustrating another example 204 of a communication device operative within one or more communication systems. In this diagram, the communication device 110 is configured to transmit signal(s), symbol(s), etc. to communication device 112 and to receive other signal(s), symbol(s), etc. from the communication device 112. Such transmission and reception of signal(s), symbol(s), etc. may be performed at different times, at the same time (e.g., simultaneous), etc. The communication device 110 is configured to detect noise generated by the communication device 110, coupled into or received by the communication device 110, coupled into or received via a communication channel between the communication device 110 and the communication device 112, etc. In some example, when the communication device 110 detects noise when the communication device 110 is transmitting, the communication device 110 operates to remove any influence of that transmission to ensure that only the noise is detected. Such removal operations may be viewed as being performed by signal processing in relatively a higher protocol layer (e.g., such as at the media access control (MAC) layer) so as not to affect signals at a relatively lower protocol layer (e.g., such as at the physical layer (PHY)). The signals at the relatively lower protocol layer are unaffected.

FIG. 2E is a diagram illustrating another example 205 of a communication device operative within one or more communication systems. In this diagram, the communication device 110 is not transmitting any signal(s), symbol(s), etc. to communication device 112 or receiving other signal(s), symbol(s), etc. from the communication device 112. The communication device 110 is configured to detect noise generated by the communication device 110, coupled into or received by the communication device 110, coupled into or received via a communication channel between the communication device 110 and the communication device 112, etc. When the communication device 110 is not transmitting, the communication device 110 configured to detect noise generated by the communication device 110, coupled into or received by the communication device 110, coupled into or received via a communication channel between the communication device 110 and the communication device 112, etc.

Note that the communication device 110 can generate various integrated powers (during transmission, when not transmitting, etc.) and populate an integrated power histogram. Such an integrated power histogram characterizes noise generated by the communication device 110, noise entering the communication device 110, and/or noise associated with one or more communication channels with which the communication device 110 interacts.

Figures 3A, 3B:
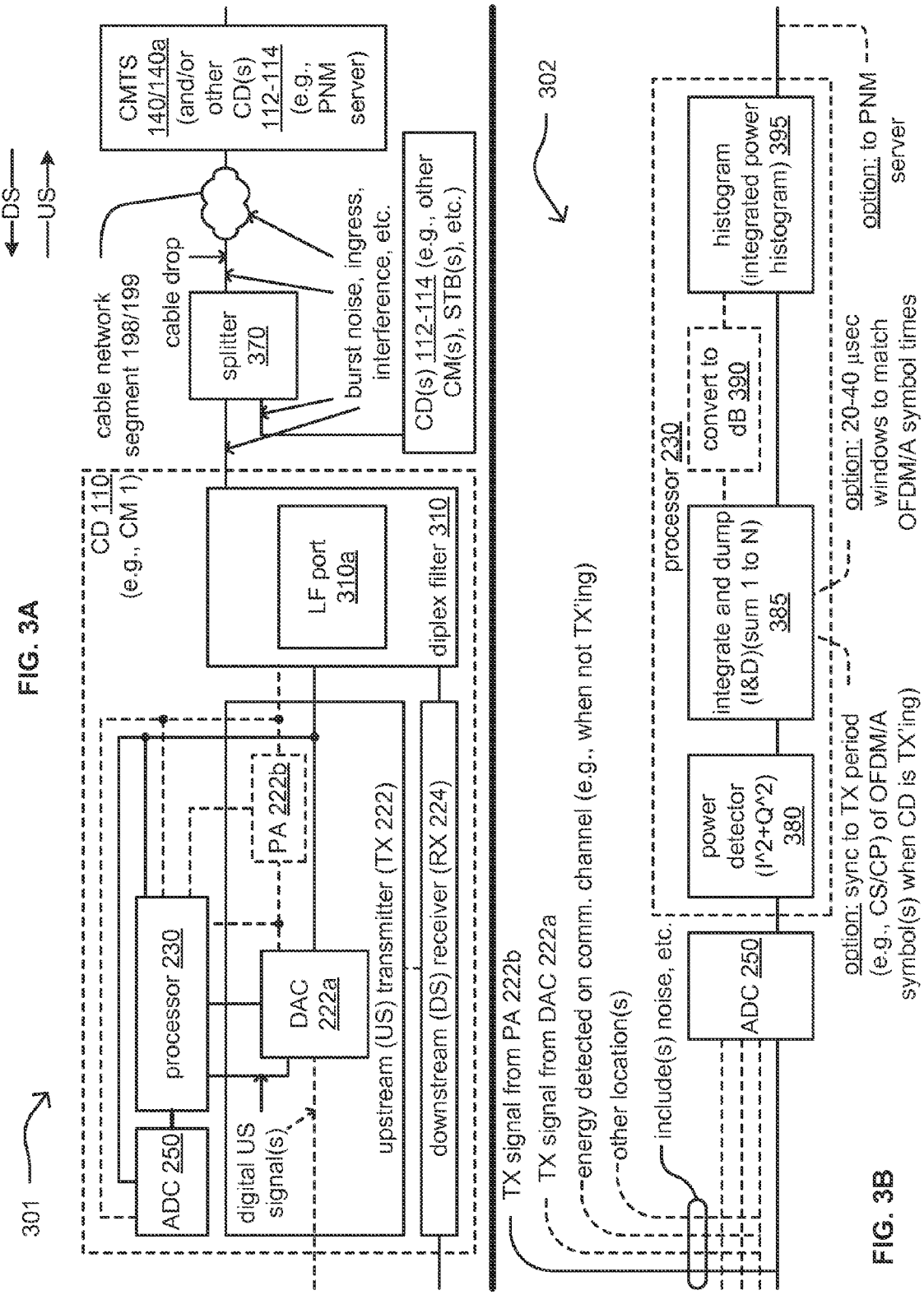
FIG. 3A is a diagram illustrating another example of at least a portion of a communication device operative within one or more communication systems.
FIG. 3B is a diagram illustrating another example of at least a portion of a communication device operative within one or more communication systems.

FIG. 3A is a diagram illustrating another example 301 of at least a portion of a communication device operative within one or more communication systems. In various examples herein, a communication device is configured to perform 'sniffing' (e.g., monitoring, detecting, analyzing, etc.) of a communication channel. For example, such sniffing may be with respect to an upstream (US) communication channel between a communication device implemented within a communication system (e.g., a CM) and another communication device implemented relatively US within that same communication system (e.g., a CMTS). In such an example, note that the direction from the CMTS to the CM may be viewed as downstream (DS).

In an example of operation, the device (e.g., device 110, communication device 110, CM 1, etc.) generates a sample capture associated with an US communication pathway (e.g., via an analog to digital converter (ADC) 250) at a remotely implemented device within the communication system (e.g., a cable modem (CM), a set top box (STB), and/or any other communication device in the communication system). The output signal from an upstream (US) transmitter (TX 222) may be provided to the low frequency (LF) port 310a of the diplex filter 310 and then, via a splitter 370, to the cable subscriber drop. This output signal from the US transmitter (TX 222) may be sniffed to perform such operations.

The device includes upstream (US) transmitter (TX 222) to generate and transmit signals upstream (US) to CMTS 140 (or CMTS 140a) or any other communication devices, such as communication devices 112-114, a proactive network maintenance (PNM) server, etc. The device also includes a downstream (DS) receiver (RX 224) to receive and process signals from any other device in the communication system.

In some examples, the US transmitter (TX 222) also includes DAC 222a and PA 222b. The sampled output signal from the PA 222b (e.g., as sampled by the ADC 250) is attenuated to the level of the input of the PA 222b. The input of the PA 222b is isolated from the source of impulse noise present at the output of the PA 222b (e.g., by a buffering effect of an amplifier). Note that some examples of the device may exclude the PA 222b. Note that the processor 230 may be configured to process a sample capture generated by the ADC 250 at output(s) of the DAC 222a and/or PA 222b, and the processor 230 itself may generate digital upstream (US) signals to be provided to the DAC 222a for generation of analog signals (which may be provided via the PA 222b) for transmission to another device in the system.

As such, in one example of operation, a processor 230 inverts the input signal and subtracts it from the attenuated output either actively (e.g., such as by using a differential amplifier) or passively (e.g., using a 'magic tee' combiner) or digitally (e.g., using the sampled input and output signals). This leaves the subtracted output free of the transmitted signal and thereby containing only noise (e.g., impulse noise, ingress noise, interference, etc.). If desired in some examples, a modification may be made to a remotely implemented device within the communication system (e.g., a cable modem (CM), a set top box (STB), and/or any other communication device in the communication system) to support such functionality.

In another example of operation, the processor 250 triggers the ADC 250 to generate a sample capture (e.g., at the output of the DAC 222a or the PA 222b) and to store that sample capture into memory at any desired threshold with or without a corresponding transmitted signal being removed there from. The processor 230 may then show the precursor to the triggering event with a small first in/first out (FIFO) delay. In some examples, a continuous wave (CW) tester may be used to perform upstream characterization of transient noise events. In other words, various examples of spectral analysis can be performed (e.g., by performing fast Fourier transform (FFT) on the sample capture) to analyze noise characteristics in the frequency domain.

The processor 230 within the remotely implemented device operates to capture such an event at or very near the source of the upstream transient disturbance. In some implementation, this may be viewed as being conducted on the coaxial shield connected to the source of the interference (e.g., the bonded electrical ground of the device) and entering the signal path of the coaxial center conductor where the coaxial shield is compromised.

Other devices in the communication system (e.g., CMs, STBs, etc.) on the upstream path will then be able to see, detect, experience, or to be affected by a much reduced, mitigated transient (or eliminated entirely) due to the isolation provided by the directional coupler in the tap connected to the cable drop that is the source of the interference. Other taps in the upstream path would provide similar isolation to all other cable drops in the upstream return path funneling the noise to the CMTS burst receiver.

In another example of operation, the influence of the transmitted signal on the integrated noise power in a transmission symbol period can be performed. The integrated power of the continuously sampled input signal (e.g. normalized sum of signal samples) in one or more configurable periods of time (e.g., 20 µs or 40 µs windows are examples consistent with Data Over Cable Service Interface Specification (DOCSIS) 3.1 OFDM/OFDMA symbol times) and provides entries for a histogram of the integrated power (e.g., to generate an integrated power histogram). If desired, the integration period may be synchronized with the upstream timing of the transmitted symbols.

FIG. 3B is a diagram illustrating another example 302 of at least a portion of a communication device operative within one or more communication systems. As shown in the diagram, the ADC sampled signal (e.g., output from ADC 250) is routed to a power detector ($I^2+Q^2$) 380 and then to an integrate-and-dump (I&D) 385 with programmable integration period (e.g., 1 µs to 50 µs). Note that the sample capture generated by the ADC 250 may be from PA 222b, from DAC 222a, from energy detected on a communication channel (e.g., when the device is not transmitting), and/or from any other location(s) that the ADC 250 is implemented to sample.

In some examples, the output from the I&D 385 may be converted to a logarithm with a particular resolution (e.g. with ¼ dB resolution), converted to dB (e.g., as in block 390), and then added to an integrated power histogram with a certain number (e.g., 512) of bins (e.g., as in block 395). In other examples, the conversion to logarithm may be excluded, and the integrated power histogram can be generated based on non-logarithmic values.

In some examples, the I&D 385 operation can be synchronized with transmission of an upstream (US) transmit signal so that the integration is aligned with the transmitted symbols. In some examples, this an orthogonal frequency division multiplexing (OFDM) or orthogonal frequency division multiple access (OFDMA) transmission symbol (symbols, or frame) that has a predetermined integrated power, and the OFDM/A symbol (symbols, or frame) include a cyclic prefix (CP), a data portion, and a cyclic suffix (CS) (e.g., such as described with respect to FIG. 4A). In some examples, the I&D 385 operation can be synchronized such that the ADC performs a sample capture of the communication channel during transmission of such an OFDM/A symbol (symbols, or frame) to begin after transmission of the CP and to end before transmission of the CS. Also, the time period(s) over which the integrated power of the continuously sampled input signal is generated (e.g., normalized sum of signal samples) may be performed within one or more configurable periods of time (e.g., 20 µs or 40 µs windows are examples consistent with DOCSIS 3.1 OFDM/OFDMA symbol times). Generally speaking, any desired periods of time may be used to perform such operations.

Since the transmitted signal power is controlled by the processor 230, and when such information associated with such a transmission symbol is known by the processor 230 (e.g., such as when the transmission symbol is generated by the processor 230, or when such characteristic(s) of the transmission symbol are provided to or known by the processor 230 when the transmission symbol is provided from another source), then the integrated signal power of each transmission symbol is known and can be subtracted from the integrated and dump signal plus noise power of each symbol (e.g., output from the I&D 385 operation) before adding the resultant value to the histogram. This effectively removes the influence or effect of a transmitted signal in each symbol period, if present, and provides the only noise power in each symbol. The resultant values in the histogram can be analyzed to provide statistics based on the number of symbol periods exceeding a threshold value likely to cause erroneous reception of those symbols (e.g. symbol error ratio, error-ed or error-free histogram periods, error-ed seconds, etc.).

Using the technique(s) presented in this disclosure, the processor 230 can operate to capture any level of interference without the transmitted signal obfuscating the underlying interference.

If desired, the digitized signal from the ADC 250 with or without the transmitted symbol (e.g., its effect) removed, histogram values, or noise statistics are then sent by the processor 230 (e.g., such as via the communication interface), to a server (e.g., remotely located from this remotely implemented device, such as a CM, STB, etc.) for analysis. Alternatively, this information may be analyzed within the processor 230 of the remotely implemented device (e.g., CM, STB, etc.) itself. A remotely implemented device that includes such analysis and capture capability (e.g., adding the ADC and signal attenuator/combiner) can perform such localization capability with a granularity of detection within the overall system down to the individual source of the impairment (e.g., identifying the particular remotely implemented device(s) that is/are introducing the deleterious effects).

Note that the novel approaches presented herein allow for analysis at the remotely implemented device level as opposed to gathering of impairment waveforms and characteristics at an upstream (US) communication device (e.g., a CMTS, a headend transmitter, etc.). Approaches that perform such gathering of impairment waveforms and characteristics at the headend will inherently include all signals plus noise from all sources within the system that are connected to the headend and are funneled into a common headend receiver input. As such, the location of the source of the noise cannot be determined uniquely in such implementation. In addition, the noise will be accompanied by the transmitted upstream signals that hide the noise and will therefore make detection difficult (and possibly impossible) unless the noise is much higher than the signal.

The principles presented in this disclosure allow for certain advantages including unique ability to identify the location of the source of the upstream impulse noise or other transient interference. Furthermore, the interfering signal is captured without the added transmitted data signal even while transmitting. This enables interfering signals to be located and the characteristics determined even for the ADC captured interference well below the transmitted signal level. Approaches that perform such gathering of impairment waveforms and characteristics at headend CMTS receiver will not have this capability.

Note also that any chip with either an integrated DAC, PA (or only a DAC) configured for upstream transmission in a cable network or a low level test port (e.g. a –20 dB directional coupler) connection to the chip can use this technique. Generally, any such communication device can operate using the principles presented in this disclosure including cable modems (CMs), set top boxes (STBs), gateways etc. and/or any communication device with an upstream transmitter (e.g., for cable based system, any communication device that has an upstream (US) transmitter in the cable return band (e.g., such as 5 to 42 MHz)).

Considering an example of operation in view of at least FIG. 3A and FIG. 3B, a device (e.g., communication device 110) includes ADC 250 and processor 230. The processor 230 directs the ADC 250 to perform a sample capture of a communication channel between the communication device 110 and another communication device, such as communication device 112. The processor 230 processes the sample capture to generate a detected power (block 380) and performs an integrate-and-dump (I&D) operation (block 385) on the detected power over at least one time period to generate an integrated power. In some examples, the processor 230 converts output from the I&D operation (block 385) to a logarithm (block 390), and then adds that to an integrated power histogram with a certain number of bins (block 395). In other examples, the logarithm conversion is not performed.

The processor 230 then generates an integrated power histogram of the communication channel that includes the integrated power. The integrated power histogram characterizes noise generated by the communication device 110, noise entering the communication device 110, and/or noise associated with a communication channel.

In some examples, the processor 230 knows information associated with a transmission symbol (e.g., type, size, length, duration, power, modulation, coding type, modulation coding set (MCS), etc. and/or any other characteristic thereof), and the processor 230 directs the ADC 250 to perform a sample capture of a communication channel between the communication device 110 and another communication device, such as communication device 112, when the communication device 110 is transmitting the transmission symbol. The processor 230 processes the sample capture to generate a detected power (block 380) and performs an integrate-and-dump (I&D) operation (block 385) on the detected power over at least one time period to generate an integrated power. The processor 230 then processes the integrated power by subtracting a predetermined integrated power there from (e.g., the predetermined integrated power associated with the transmission symbol) to generate an adjusted integrated power. This removes the influence or effect of the transmission symbol and provides the only noise power. The processor 230 then adds that adjusted integrated power to an integrated power histogram (block 395).

In another example of operation, the processor 230 directs the ADC 250 to perform a sample capture of the communication channel during transmission of a transmission symbol (e.g., whose characteristic(s) are known) into the communication channel. Consider a transmission symbol having a predetermined integrated power within a subset of sub-carriers of a plurality of sub-carriers that spans a full bandwidth of a usable frequency spectrum within the communication channel between the communication device and another communication device. The communication device 110 transmits the transmission symbol into the communication channel via the subset of sub-carriers. The processor 230 processes the sample capture to generate a detected power and performs an integrate-and-dump (I&D) operation (block 385) on the other detected power over at least one other time period to generate an integrated power. The processor 230 subtracts a first integrated power from the other integrated power to generate a second integrated power. In some examples, the first integrated power is determined from the measured integrated power of a symbol that spans the full bandwidth of the usable frequency spectrum scaled by the ratio of the predetermined integrated power of the transmitted symbol to the predetermined signal power of a symbol that spans the full bandwidth of the usable frequency spectrum within the communication channel between the communication device and another communication device. The processor then adds that second integrated power to an integrated power histogram (block 395).

In another example of operation, the processor 230 directs the ADC 250 to perform a probe symbol that spans a full bandwidth of a usable frequency spectrum within the communication channel (e.g., whose characteristic(s) are known) into the communication channel. The processor 230 processes the sample capture to generate a detected power and performs an integrate-and-dump (I&D) operation (block 385) on the other detected power over at least one other time period to generate a probe integrated power. The processor 230 then generates a calibration integrated power histogram of the communication channel that includes the probe integrated power. The calibration integrated power histogram characterizes noise generated by the communication device 110, noise entering the communication device 110 during transmission of the probe symbol that spans the full bandwidth of the usable frequency spectrum within the communication channel, noise associated with the communication channel, and/or noise associated with the communication system.

In another example of operation, the processor 230 updates the integrated power histogram of the communication channel using a number of other integrated powers associated with a number of other sample captures of the communication channel between the communication device and another communication device to generate an updated integrated power histogram. The processor 230 analyzes the updated integrated power histogram, after the update of the integrated power histogram, to identify whether the updated integrated power histogram cumulative sum includes any value that exceeds at least one threshold. The processor 230 then identifies any erroneous operation of the communication device when the updated integrated power histogram cumulative sum includes the at least one value that exceeds the at least one threshold.

Note that the communication device 110 may also be configured to transmit the integrated power histogram to and for use by another device (e.g., another communication device in the communication system, a PNM communication device, a CMTS, etc. that is configured to determine characteristic(s) associated with performance of the communication channel and/or the communication device 110.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequencies of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 4A) that may be a copy of the end and/or beginning portion of the data symbol may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 4E is a diagram illustrating an example 405 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface (or alternatively a processor, such a processor 230a shown in FIG. 2A) configured to process received OFDM or OFDMA symbols and/or frames (and/or SC symbols and/or frames) and to generate such OFDM or OFDMA symbols and/or frames (and/or SC symbols and/or frames). Any device described herein may be configured to generate and transmit, and/or receive, process, and interpret such OFDM or OFDMA symbols and/or frames (and/or SC symbols and/or frames).

FIG. 5A is a diagram illustrating an example 501 of an integrated power histogram. Generally speaking, a histogram represents a frequency distribution of numerical data and provides an estimate of the probability distribution. The horizontal axis is divided into bins, where each bin is a sub-interval of the range. The vertical axis shows a frequency or count of how many times a resultant of the numerical data lies within each respective bin. In the context of an integrated power histogram, the horizontal axis is divided into bins of integrated power ranges (e.g., a bin 1 including integrated power ranging between a first level and a second level; a bin 2 including integrated power ranging between the second level and a third level; and so on). The vertical axis shows the vertical axis shows a frequency or count of how many times a resultant of the integrated power lies within each respective bin of the integrated power ranges. Note that probe symbol(s) may be used in accordance with calibration to establish a baseline of operation of a device, and such a calibration integrated power histogram may be used for comparison and analysis of a device with reference to subsequent or ongoing operations.

In an example of operation, the integrated power histogram may be analyzed to identify whether any value therein that exceeds at least one threshold. Such an integrated power histogram includes a number of integrated power bins, and any desired number of thresholds may be used with respect to the various integrated power bins (e.g., different thresholds respective for each cumulative sum of contiguous integrated power bins that include the relatively highest power bin; a first threshold for a first sum of two or more such contiguous integrated power bins and a second threshold for a second sum of three or more such contiguous integrated power bins and so on; etc.).

By comparing the summed counts within the integrated power bins of the integrated power histogram, a device can identify erroneous operation of the communication system, communication channel, and/or the device itself. For example, when an integrated power histogram cumulative sum includes at least one value that exceeds at least one threshold, then erroneous operation can be identified. Again, such analysis may be made overall with respect to the entire integrated power histogram, on a per bin basis across the integrated power histogram, etc.

FIG. 5B is a diagram illustrating an example 502 of a communication channel partitioned into multiple sub-bands or sub-channels. Note that a fullband probe may be used such that the fullband probe spans a full bandwidth of a usable frequency spectrum (e.g., spans all of the usable frequency, bandwidth, sub-carriers, etc.) of a communication channel between at least two devices. Considering the example 502, the communication channel is divided into X channels each having a respective frequency range, bandwidth, number of sub-carriers, etc. Note that some examples may include X channels each having a same/common size (e.g., same bandwidth, same number of sub-carriers, etc.), and other examples may include X channels each having a different size (e.g., different bandwidths, different numbers of sub-carriers, etc.).

FIG. 5C is a diagram illustrating another example 503 of a communication channel partitioned into multiple sub-bands or sub-channels. A device may transmit a transmission symbol having a known integrated power within a subset of sub-carriers that span a full bandwidth of a usable frequency spectrum within the communication channel between the two devices. For example, a device may transmit a symbol via such a subset of sub-carriers having a power of A dBmV (where A is some known value). Consider that a probe symbol transmitted across all of the sub-carriers having a power of B dBmV (where B is some known value). Then, after a processor directs an ADC to perform a sample capture of the communication channel during transmission of such a symbol (e.g., whose characteristic(s) are known, such as transmitted via a subset of sub-carriers having a power of A dBmV) into the communication channel. The processor then processes the sample capture from the ADC to generate a detected power and performs an integrate-and-dump (I&D) operation on that result over at least one other time period to generate an integrated power. The processor 230 subtracts a first integrated power (e.g., a scaled, integrated power of A/B) from the integrated power to generate a second integrated power. In some examples, this first integrated power is determined from the measured integrated power of a symbol that spans the full bandwidth of the usable frequency spectrum scaled by the ratio of the predetermined integrated power (e.g., of the symbol transmitted via a subset of sub-carriers having a power of A dBmV) to the probe symbol's predetermined integrated power (e.g., e.g., of the probe symbol transmitted via all sub-carriers having a power of B dBmV). The processor then uses that second integrated power to generate the integrated power histogram.

Generally, various signals may be transmitted (e.g., (1) wideband signal(s), probe(s), OFDM/A symbol(s), frame(s), etc. that may span any combination of 2 or more channels and/or (2) narrowband signal(s), probe(s), OFDM/A symbol(s), frame(s), etc. that may span any as few as 1 channel). When characteristics of a signal is known, then any effect of such a signal that is included within a sample capture can be removed before including such information any such corresponding integrated power into an integrated power histogram. As may be appropriate in some instances, scaling of the integrated power associated with such a transmission symbol (e.g., when transmitted via a sub-portion of the entire channel, a subset of the sub-carriers, etc.) may be made with respect to removing the effect of the transmission symbol from an associated sample capture.

FIG. 6A is a diagram illustrating an embodiment of a method 601 for execution by one or more communication devices. The method 601 begins by directing an analog to digital converter (ADC) of the communication device to perform a sample capture of a communication channel between the communication device and another communication device (block 610). The method 601 continues by processing the sample capture to generate a detected power (block 620). The method 601 then operates by performing an integrate-and-dump operation on the detected power over at least one time period to generate an integrated power (block 630). The method 601 continues by generating an integrated power histogram of the communication channel that includes the integrated power (block 640). The integrated power histogram characterizes noise generated by the communication device and/or noise entering the communication device.

FIG. 6B is a diagram illustrating another embodiment of a method 602 for execution by one or more communication devices. The method 602 begins by directing an ADC to perform a sample capture of a communication channel during transmission of a transmission symbol into the communication channel (block 611). The transmission symbol has a predetermined or known integrated power. The method 602 continues by processing the sample capture to generate a detected power (block 621). The method 602 then operates by performing an integrate-and-dump operation on the detected power over at least one other time period to generate an integrated power (block 631). The method 602 continues by subtracting the predetermined integrated power from the integrated power to generate an adjusted integrated power (block 641). The method 602 continues by generating an integrated power histogram of the communication channel that includes the integrated power (block 651). The integrated power histogram characterizes noise generated by the communication device and/or noise entering the communication device. This adjusted integrated power has any effect of the transmission symbol removed there from, so that the remaining portion included within the integrated power histogram includes only the noise, interference, etc.

FIG. 7A is a diagram illustrating another embodiment of a method 701 for execution by one or more communication devices. The method 701 begins by directing the ADC to perform a sample capture of a communication channel during transmission of the transmission symbol into the communication channel (block 710). The transmission symbol has a predetermined or known integrated power and is transmitted via a subset of sub-carriers of a total number of sub-carriers that span a full bandwidth of a usable frequency spectrum within the communication channel between the communication device and another communication device.

The method 701 then operates by processing the sample capture to generate a detected power (block 720). The method 701 continues by performing an integrate-and-dump operation on the detected power over at least one other time period to generate an integrated power (block 730). The method 701 then operates by subtracting a first integrated power from the integrated power to generate a second integrated power (block 740). In some examples, this first integrated power is determined from the measured integrated power of a symbol that spans the full bandwidth of the usable frequency spectrum scaled by the ratio of the predetermined integrated power to the predetermined signal power of a symbol that spans the full bandwidth of the usable frequency spectrum within the communication channel between the communication device and another communication device. The method 701 continues by generating an integrated power histogram of the communication channel that includes the integrated power (block 750). The integrated power histogram characterizes noise generated by the communication device and/or noise entering the communication device. This adjusted integrated power has any effect of the transmission symbol removed there from, so that the remaining portion included within the integrated power histogram includes only the noise, interference, etc.

FIG. 7B is a diagram illustrating another embodiment of a method 702 for execution by one or more communication devices. The method 702 begins by directing an ADC to perform a sample capture of a communication channel during transmission of a probe symbol into the communication channel (block 711). In one example, the probe symbol spans a full bandwidth of a usable frequency spectrum within the communication channel between the communication device and another communication device. The method 702 continues by processing the sample capture to generate probe detected power (block 721). The method 702 then operates by performing an integrate-and-dump operation on the probe detected power over at least one other time period to generate a probe integrated power (block 731). The method 702 continues by generating a calibration integrated power histogram of the communication channel that includes the probe integrated power (block 741). The calibration integrated power histogram characterizes noise generated by the communication device, noise entering the communication device during transmission of the probe symbol that spans the full bandwidth of the usable frequency spectrum within the communication channel, and/or noise associated with the communication channel.

Figure 8:
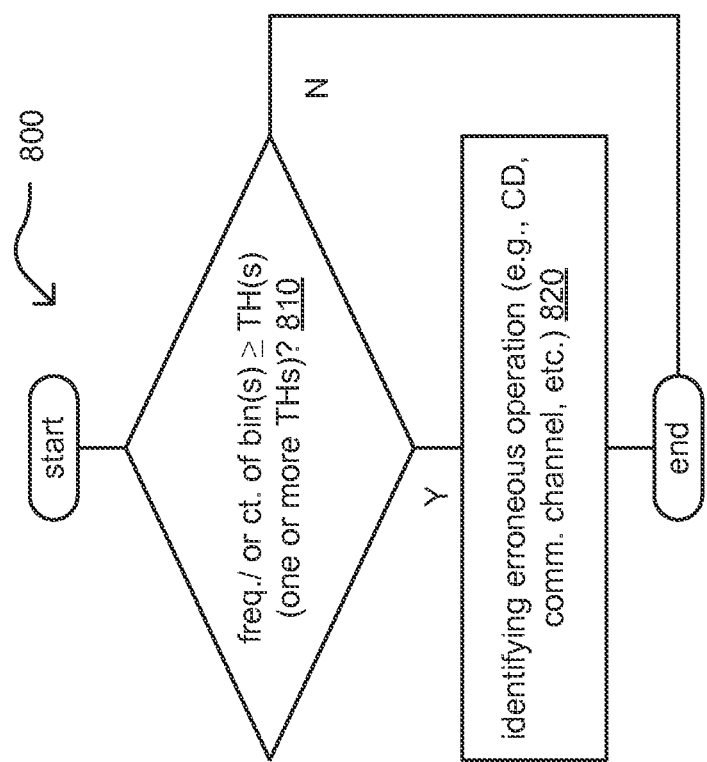
FIG. 8 is a diagram illustrating another embodiment of a method for execution by one or more communication devices.

FIG. 8 is a diagram illustrating another embodiment of a method 800 for execution by one or more communication devices. The method 800 begins by comparing the frequency or count of the sum of one or more integrated contiguous power bins of an integrated power histogram including the relatively highest power bin to one or more thresholds and determining if frequency or count of any of the integrated power bin sums are greater than or equal to the to one or more thresholds (decision block 810).

When no frequency or count of any of the cumulative sums of the integrated power bins are greater than or equal to the one or more thresholds, the method 800 ends. Alternatively, when at least one frequency or count of at least one of the cumulative sums of the integrated power bins are greater than or equal to the one or more thresholds, the method 800 continues by identifying erroneous operation of the communication device, the communication channel, etc. (block 820).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
an analog-to-digital converter (ADC); and
a processor configured to:
generate a signal;
transmit the signal via a communication channel to another communication device;
direct the ADC to perform a sample capture of the communication channel between the communication device and the another communication device during transmission of the signal into the communication channel;
process the sample capture to generate a detected power;
perform an integrate-and-dump operation on the detected power over at least one time period to generate an integrated power; and
generate an integrated power histogram of the communication channel that includes the integrated power, wherein the integrated power histogram characterizes at least one of first noise generated by the communication device or second noise entering the communication device.

2. The communication device of claim 1, wherein the processor is further configured to:
generate the signal to include a transmission symbol having a predetermined integrated power;
transmit the signal that includes the transmission symbol into the communication channel;
direct the ADC to perform another sample capture of the communication channel during transmission of the transmission symbol into the communication channel;
process the another sample capture to generate another detected power;
perform another integrate-and-dump operation on the another detected power over at least one other time period to generate another integrated power;
subtract the predetermined integrated power from the another integrated power to generate an adjusted integrated power; and
update the integrated power histogram of the communication channel using the adjusted integrated power.

3. The communication device of claim 1, wherein the processor is further configured to:
generate the signal to include a transmission symbol having a predetermined integrated power within a subset of sub-carriers of a plurality of sub-carriers that spans a full bandwidth of a usable frequency spectrum within the communication channel between the communication device and another communication device;
transmit the signal that includes the transmission symbol into the communication channel via the subset of sub-carriers;
direct the ADC to perform another sample capture of the communication channel during transmission of the transmission symbol into the communication channel;
process the another sample capture to generate another detected power;
perform another integrate-and-dump operation on the another detected power over at least one other time period to generate another integrated power;
subtract a first integrated power from the another integrated power to generate a second integrated power, wherein the first integrated power is determined from a measured integrated power of a symbol that spans the full bandwidth of the usable frequency spectrum scaled by a ratio of the predetermined integrated power of the transmission symbol to another predetermined signal power of another symbol that spans the full bandwidth of the usable frequency spectrum; and
update the integrated power histogram of the communication channel using the second integrated power.

4. The communication device of claim 1, wherein the processor is further configured to:
generate the signal to include a probe symbol that spans a full bandwidth of a usable frequency spectrum within the communication channel between the communication device and another communication device;
direct the ADC to perform another sample capture of the communication channel during transmission of the probe symbol into the communication channel;
process the another sample capture to generate probe detected power;
perform another integrate-and-dump operation on the probe detected power over at least one other time period to generate a probe integrated power; and
generate a calibration integrated power histogram of the communication channel that includes the probe integrated power, wherein the calibration integrated power histogram characterizes the at least one of the first noise generated by the communication device or the second noise entering the communication device during transmission of the probe symbol that spans the full bandwidth of the usable frequency spectrum within the communication channel.

5. The communication device of claim 1, wherein the processor is further configured to:
update the integrated power histogram of the communication channel using a plurality of other integrated powers associated with a plurality of other sample captures of the communication channel between the communication device and another communication device to generate an updated integrated power histogram;
analyze the updated integrated power histogram, after the update of the integrated power histogram, to identify whether any cumulative sum of the updated integrated power histogram exceeds at least one threshold; and
identify erroneous operation of the communication device when the updated integrated power histogram includes at least one value that exceeds the at least one threshold.

6. The communication device of claim 1, wherein the processor is further configured to:
transmit the integrated power histogram that characterizes the at least one of the first noise generated by the communication device or the second noise entering the communication device to and for use by at least one of the another communication device or a proactive network maintenance (PNM) communication device to determine at least one characteristic associated with performance of at least one of the communication channel or the communication device.

7. The communication device of claim 1 further comprising:
   a cable modem, wherein the another communication device is a cable headend transmitter or a cable modem termination system (CMTS).

8. The communication device of claim 1, wherein the processor is further configured to:
   support communications within at least one of a satellite communication system, a wireless communication system, a wired communication system, a fiber-optic communication system, or a mobile communication system.

9. A communication device comprising:
   an analog-to-digital converter (ADC); and
   a processor configured to:
      generate an orthogonal frequency division multiplexing (OFDM) transmission symbol having a predetermined integrated power, wherein the OFDM transmission symbol includes a cyclic prefix (CP), a data portion, and a cyclic suffix (CS);
      transmit the OFDM transmission symbol into a communication channel between the communication device and another communication device;
      direct the ADC to perform a first sample capture of the communication channel during transmission of the OFDM transmission symbol into the communication channel and to synchronize the first sample capture to begin after transmission of the CP and to end before transmission of the CS;
      process the first sample capture to generate a first detected power;
      perform a first integrate-and-dump operation on the first detected power over a first at least one time period to generate a first integrated power;
      subtract the predetermined integrated power from the first integrated power to generate a first modified integrated power;
      direct the ADC to perform a second sample capture of the communication channel when the communication device is not transmitting any signal into the communication channel;
      process the second sample capture to generate a second detected power;
      perform a second integrate-and-dump operation on the second detected power over a second at least one time period to generate a second integrated power;
      generate an integrated power histogram of the communication channel that includes the first modified integrated power and the second integrated power, wherein the integrated power histogram characterizes at least one of first noise generated by the communication device or second noise entering the communication device;
      analyze the integrated power histogram to identify whether any cumulative sum of any contiguous power bins of the integrated power histogram that include a relatively highest power bin exceeds at least one threshold; and
      identify erroneous operation of the communication device when the integrated power histogram includes at least one value that exceeds the at least one threshold.

10. The communication device of claim 9, wherein the processor is further configured to:
   generate another OFDM transmission symbol having another predetermined integrated power within a subset of sub-carriers of a plurality of sub-carriers that spans a full bandwidth of a usable frequency spectrum within the communication channel between the communication device and another communication device, wherein the another OFDM transmission symbol includes another CP, another data portion, and another CS;
   transmit the another OFDM transmission symbol into the communication channel via the subset of sub-carriers;
   direct the ADC to perform a third sample capture of the communication channel during transmission of the another OFDM transmission symbol into the communication channel and to synchronize the third sample capture to begin after transmission of the another CP and to end before transmission of the another CS;
   process the third sample capture to generate a third detected power;
   perform a third integrate-and-dump operation on the third detected power over a third at least one time period to generate a third integrated power;
   subtract a first other integrated power from the third integrated power to generate a second other integrated power, wherein the first other integrated power is determined from a measured integrated power of a symbol that spans the full bandwidth of the usable frequency spectrum scaled by a ratio of the another predetermined integrated power to at least one other predetermined signal power of at least one other symbol that spans the full bandwidth of the usable frequency spectrum; and
   update the integrated power histogram of the communication channel using the second other integrated power.

11. The communication device of claim 9, wherein the processor is further configured to:
   generate a probe symbol that spans a full bandwidth of a usable frequency spectrum within the communication channel between the communication device and another communication device;
   direct the ADC to perform another sample capture of the communication channel during transmission of the probe symbol into the communication channel;
   process the another sample capture to generate probe detected power;
   perform another integrate-and-dump operation on the probe detected power over at least one other time period to generate a probe integrated power; and
   generate a calibration integrated power histogram of the communication channel that includes the probe integrated power, wherein the calibration integrated power histogram characterizes the at least one of the first noise generated by the communication device or the second noise entering the communication device during transmission of the probe symbol that spans the full bandwidth of the usable frequency spectrum within the communication channel.

12. The communication device of claim 9 further comprising:
   a cable modem, wherein the another communication device is a cable headend transmitter or a cable modem termination system (CMTS).

13. The communication device of claim 9, wherein the processor is further configured to:
   support communications within at least one of a satellite communication system, a wireless communication system, a wired communication system, a fiber-optic communication system, or a mobile communication system.

14. A method for execution by a communication device, the method comprising:
generating a signal;
transmitting the signal via a communication channel to another communication device;
directing an analog-to-digital converter (ADC) of the communication device to perform a sample capture of the communication channel between the communication device and the another communication device during transmission of the signal into the communication channel;
processing the sample capture to generate a detected power;
performing an integrate-and-dump operation on the detected power over at least one time period to generate an integrated power; and
generating an integrated power histogram of the communication channel that includes the integrated power, wherein the integrated power histogram characterizes at least one of first noise generated by the communication device or second noise entering the communication device.

15. The method of claim 14 further comprising:
generating the signal to include a transmission symbol having a predetermined integrated power;
transmitting, via a communication interface of the communication device, the signal that includes the transmission symbol into the communication channel;
directing the ADC to perform another sample capture of the communication channel during transmission of the transmission symbol into the communication channel;
processing the another sample capture to generate another detected power;
performing another integrate-and-dump operation on the another detected power over at least one other time period to generate another integrated power;
subtracting the predetermined integrated power from the another integrated power to generate an adjusted integrated power; and
updating the integrated power histogram of the communication channel using the adjusted integrated power.

16. The method of claim 14 further comprising:
generating the signal to include a transmission symbol having a predetermined integrated power within a subset of sub-carriers of a plurality of sub-carriers that spans a full bandwidth of a usable frequency spectrum within the communication channel between the communication device and another communication device;
transmitting the signal that includes the transmission symbol into the communication channel via the subset of sub-carriers;
directing the ADC to perform another sample capture of the communication channel during transmission of the transmission symbol into the communication channel;
processing the another sample capture to generate another detected power;
performing another integrate-and-dump operation on the another detected power over at least one other time period to generate another integrated power;
subtracting a first integrated power from the another integrated power to generate a second integrated power, wherein the first integrated power is determined from a measured integrated power of a symbol that spans the full bandwidth of the usable frequency spectrum scaled by a ratio of the predetermined integrated power of the transmission symbol to another predetermined signal power of another symbol that spans the full bandwidth of the usable frequency spectrum; and
updating the integrated power histogram of the communication channel using the second integrated power.

17. The method of claim 14 further comprising:
generating the signal to include a probe symbol that spans a full bandwidth of a usable frequency spectrum within the communication channel between the communication device and another communication device;
directing the ADC to perform another sample capture of the communication channel during transmission of the probe symbol into the communication channel;
processing the another sample capture to generate probe detected power;
performing another integrate-and-dump operation on the probe detected power over at least one other time period to generate a probe integrated power; and
generating a calibration integrated power histogram of the communication channel that includes the probe integrated power, wherein the calibration integrated power histogram characterizes the at least one of the first noise generated by the communication device or the second noise entering the communication device during transmission of the probe symbol that spans the full bandwidth of the usable frequency spectrum within the communication channel.

18. The method of claim 14 further comprising:
transmitting, via a communication interface of the communication device, the integrated power histogram that characterizes the at least one of the first noise generated by the communication device or the second noise entering the communication device to and for use by at least one of the another communication device or a proactive network maintenance (PNM) communication device to determine at least one characteristic associated with performance of at least one of the communication channel or the communication device.

19. The method of claim 14, wherein the communication device is a cable modem, and the another communication device is a cable headend transmitter or a cable modem termination system (CMTS).

20. The method of claim 14 further comprising:
operating the communication device to support communications within at least one of a satellite communication system, a wireless communication system, a wired communication system, a fiber-optic communication system, or a mobile communication system.

21. A communication device comprising:
a communication interface that includes an analog-to-digital converter (ADC), a digital-to-analog converter (DAC), and a power amplifier (PA), wherein an output of the DAC is coupled to the PA, an output of the PA is coupled to a communication channel, and the ADC is coupled to the communication channel; and
a processor, coupled to the ADC, the DAC, and the PA, that is configured to:
support communications, via the communication interface and via the communication channel, with another communication device including to transmit a signal to the another communication device via the communication channel; and
process at least one of an ADC input signal to the ADC, an ADC output signal from the ADC, a DAC input signal to the DAC, a DAC output signal from the DAC, a PA input signal to the PA, or a PA output signal from the PA to identify and characterize any upstream (US) transient impairment within the communication device including to:
- monitor at least one of the DAC output signal, the PA input signal, or the PA output signal;
- attenuate the PA output signal to a level of the PA input signal based on the DAC output signal to generate an attenuated PA output signal;
- subtract the DAC output signal from the attenuated PA output signal to remove a transmitted signal from another signal including noise that is detected at an input to the communication channel to generate a noise-only signal;
- direct the ADC to sample the noise-only signal to generate a sample capture; and
- process the sample capture to identify and characterize the any US transient impairment within the communication device.

22. The communication device of claim 21 further comprising:
a cable headend transmitter or a cable modem termination system (CMTS), wherein the another communication device is a cable modem.

23. The communication device of claim 21, wherein the processor is further configured to:
transmit, via the communication interface, information related to identification and characterization of the US transient impairment to at least one of the another communication device or a proactive network maintenance (PNM) communication device.

24. The communication device of claim 21 further comprising:
a cable modem, wherein the another communication device is a cable headend transmitter or a cable modem termination system (CMTS).

25. The communication device of claim 21, wherein the communication device is further configured to:
support communications within at least one of a satellite communication system, a wireless communication system, a wired communication system, a fiber-optic communication system, or a mobile communication system.

* * * * *